United States Patent
Hu et al.

(10) Patent No.: US 11,100,406 B2
(45) Date of Patent: Aug. 24, 2021

(54) KNOWLEDGE NETWORK PLATFORM

(71) Applicant: Futurewei Technologies, Inc., Plano, TX (US)

(72) Inventors: Luhui Hu, Bellevue, WA (US); Hui Zang, Santa Clara, CA (US); Ziang Hu, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 836 days.

(21) Appl. No.: 15/473,232

(22) Filed: Mar. 29, 2017

(65) Prior Publication Data
US 2018/0285764 A1 Oct. 4, 2018

(51) Int. Cl.
*G06N 5/02* (2006.01)
*G06N 5/04* (2006.01)
(Continued)

(52) U.S. Cl.
CPC ............. *G06N 5/02* (2013.01); *G06N 5/022* (2013.01); *G06N 5/04* (2013.01); *G06N 20/00* (2019.01);
(Continued)

(58) Field of Classification Search
CPC ........ G06N 5/02; G06N 99/00; G06N 99/005; H04L 67/10; H04L 29/08; G06F 17/30
See application file for complete search history.

(56) References Cited

U.S. PATENT DOCUMENTS

| | | | | |
|---|---|---|---|---|
| 2013/0066823 | A1* | 3/2013 | Sweeney | G06N 5/02 706/50 |
| 2013/0097246 | A1* | 4/2013 | Zifroni | G06Q 50/01 709/204 |

(Continued)

FOREIGN PATENT DOCUMENTS

| | | |
|---|---|---|
| CN | 106529673 A | 3/2017 |
| EP | 2570936 A1 | 3/2013 |

OTHER PUBLICATIONS

Symeonidis, Panagiotis, Eleftherios Tiakas, and Yannis Manolopoulos. "Transitive node similarity for link prediction in social networks with positive and negative links." Proceedings of the fourth ACM conference on Recommender systems. ACM, 183-190. (Year: 2010).*

(Continued)

*Primary Examiner* — Kamran Afshar
*Assistant Examiner* — Randall K. Baldwin
(74) *Attorney, Agent, or Firm* — Schwegman Lundberg & Woessner, P.A.

(57) ABSTRACT

An apparatus and method are provided for a managed knowledge network platform (KNP). Model dissimilarity values for model pairs are obtained, each model pair including a first model of a plurality of models in a KNP and a different model in the plurality of models. Path lengths between a first model node of a plurality of model nodes in the KNP and each one of other model nodes are computed, where the first model node represents the first model and the first model node is connected to a first user node of a plurality of user nodes representing users of the KNP. At (Continued)

least one of the different models is selected based on the model dissimilarity values and the path lengths. A recommendation that includes the at least one model is generated for a first user represented by the first user node.

20 Claims, 11 Drawing Sheets

(51) Int. Cl.
- *G06N 3/04* (2006.01)
- *G06N 20/00* (2019.01)
- *H04L 29/08* (2006.01)
- *G06N 20/20* (2019.01)
- *G06N 20/10* (2019.01)
- *G06N 7/00* (2006.01)

(52) U.S. Cl.
CPC ............ *H04L 67/10* (2013.01); *H04L 67/306* (2013.01); *G06N 3/0445* (2013.01); *G06N 3/0454* (2013.01); *G06N 7/005* (2013.01); *G06N 20/10* (2019.01); *G06N 20/20* (2019.01)

(56) References Cited

U.S. PATENT DOCUMENTS

| | | | |
|---|---|---|---|
| 2013/0262361 A1* | 10/2013 | Arroyo | G06N 5/02 706/46 |
| 2014/0101173 A1 | 4/2014 | Moon et al. | |
| 2014/0317033 A1* | 10/2014 | Mojsilovic | G06Q 10/00 706/17 |
| 2015/0379429 A1* | 12/2015 | Lee | G09B 5/00 706/11 |
| 2016/0132787 A1* | 5/2016 | Drevo | G06N 20/00 706/12 |
| 2018/0097744 A1 | 4/2018 | Hu et al. | |
| 2018/0255122 A1 | 9/2018 | Hu et al. | |
| 2018/0276560 A1* | 9/2018 | Hu | G06N 20/00 |

OTHER PUBLICATIONS

Leskovec, Jure, Daniel Huttenlocher, and Jon Kleinberg. "Predicting positive and negative links in online social networks." Proceedings of the 19th international conference on World wide web. ACM, 2010, 641-650. (Year: 2010).*

Papadimitriou, Alexis, Panagiotis Symeonidis, and Yannis Manolopoulos. "Fast and accurate link prediction in social networking systems." Journal of Systems and Software 85.9 (2012): 2119-2132 (Year: 2012).*

Symeonidis, Panagiotis, and Nikolaos Mantas. "Spectral clustering for link prediction in social networks with positive and negative links." Social Network Analysis and Mining 3.4 (2013): 1433-1447 (Year: 2013).*

Jalili, Mahdi, et al. "Link prediction in multiplex online social networks." Royal Society open science 4.2 (Jan. 2017): 160863, 1-11. (Year: 2017).*

Turner, Andrew. Evolving artificial neural networks using Cartesian genetic programming. Diss. University of York, 2015: i-316. (Year: 2015).*

Hilario, Melanie, and Alexandras Kalousis. "Fusion of meta-knowledge and meta-data for case-based model selection." European Conference on Principles of Data Mining and Knowledge Discovery. Springer, Berlin, Heidelberg, 2001: 180-191 (Year: 2001).*

Onnela, Jukka-Pekka, et al. "Analysis of a large-scale weighted network of one-to-one human communication." New journal of physics 9.6 (2007): 179. (Year: 2007).*

Sadegh Motallebi, Sadegh Aliakbary, and Jafar Habibi. "Generative model selection using a scalable and size-independent complex network classifier" (Year: 2013).*

Bliss, Catherine A., et al. "An evolutionary algorithm approach to link prediction in dynamic social networks." Journal of Computational Science 5.5 (2014): 750-764. (Year: 2014).*

Zang, Wenyu, Xiao Wang, and Yue Hu. "A Fast Algorithm for Competitive Recommendation Marketing Strategy." 2016 IEEE First International Conference on Data Science in Cyberspace (DSC). IEEE, 2016: 620-625. (Year: 2016).*

Kong, Yiming, Hui Zang, and Xiaoli Ma. "Quick model fitting using a classifying engine." 2016 IEEE International Conference on Big Data (Big Data). IEEE, 2016: 2728-2733. (Year: 2016).*

"International Application No. PCT/CN2018/079364, International Search Report and Written Opinion dated May 31, 2018", (dated May 31, 2018), 10 pgs.

* cited by examiner

KNOWLEDGE NETWORK PLATFORM

FIELD OF THE INVENTION

The present disclosure relates to machine learning, and more particularly to a knowledge network platform for sharing models.

BACKGROUND

Over the past few years, machine learning has dominated approaches to solving many important problems in computing such as speech recognition, machine translation, handwriting recognition and many computer vision problems such as face, object and scene recognition. Existing machine learning techniques include transfer learning, ensemble learning, incremental learning, and reinforcement learning. Accuracy of a machine learning system depends on the development and training of a machine learning model and the training requires large amounts of raw data.

Several algorithms are available to implement a machine learning model. However, resources (large training datasets) needed to adequately train the model are privately owned and not generally available to the public. A model developed and trained for one classification domain (e.g., face recognition) may be adapted using transfer learning and other techniques to generate a new model for a different classification domain (e.g., expression recognition). It is desirable to enable sharing of models that can be adapted to generate new models.

SUMMARY

According to one embodiment of the present invention, there is provided an apparatus for a managed knowledge network platform. Included are a non-transitory memory storing instructions and one or more processors in communication with the non-transitory memory. The one or more processors execute the instructions to obtain model dissimilarity values, compute path lengths, select at least one model of a plurality of models based on the model dissimilarity values and the path lengths, and generate, for a first user represented by the first user node, a recommendation that includes the at least one model. The model dissimilarity values are obtained for model pairs, each model pair including a first model of the plurality of models in a knowledge network platform and a different model in the plurality of models. The path lengths are computed between a first model node of a plurality of model nodes in the knowledge network platform and each one of other model nodes in the knowledge network platform, wherein the first model node represents the first model and the first model node is connected to a first user node of a plurality of user nodes representing users of the knowledge network platform.

According to one embodiment of the present invention, there is provided a method comprising obtaining model dissimilarity values, computing path lengths, selecting at least one model of a plurality of models based on the model dissimilarity values and the path lengths, and generating, for a first user represented by the first user node, a recommendation that includes the at least one model. The model dissimilarity values are obtained for model pairs, each model pair including a first model of the plurality of models in a knowledge network platform and a different model in the plurality of models. The path lengths are computed between a first model node of a plurality of model nodes in the knowledge network platform and each one of other model nodes in the knowledge network platform, wherein the first model node represents the first model and the first model node is connected to a first user node of a plurality of user nodes representing users of the knowledge network platform.

According to one embodiment of the present invention, there is provided a non-transitory computer-readable media storing computer instructions. When the computer instructions are executed by one or more processors, the one or more processors perform the steps of obtaining model dissimilarity values, computing path lengths, selecting at least one model of a plurality of models based on the model dissimilarity values and the path lengths, and generating, for a first user represented by the first user node, a recommendation that includes the at least one model. The model dissimilarity values are obtained for model pairs, each model pair including a first model of the plurality of models in a knowledge network platform and a different model in the plurality of models. The path lengths are computed between a first model node of a plurality of model nodes in the knowledge network platform and each one of other model nodes in the knowledge network platform, wherein the first model node represents the first model and the first model node is connected to a first user node of a plurality of user nodes representing users of the knowledge network platform. Optionally, in any of the preceding embodiments, the one or more processors execute the instructions to publish the first model in response to input from the first user. Optionally, the different models in the model pairs are not published by the first user. Optionally, the one or more processors execute the instructions to provide a bidirectional link between the first user node and the first model node.

Optionally, in any of the preceding embodiments, the one or more processors execute the instructions to permit subscription to the first model by the first user.

Optionally, in any of the preceding embodiments, the one or more processors execute the instructions to permit subscription to the first model by a second user and provide a unidirectional link from the second user to the first user.

Optionally, in any of the preceding embodiments, the first user is a member of a first community and the one or more processors execute the instructions to provide a unidirectional link from the first user to a first community node representing the first community. Optionally, the first community is hierarchical and includes a portion of a second community.

Optionally, in any of the preceding embodiments, the one or more processors execute the instructions to compute weight values for links between two of more of the user nodes and pairs of the user nodes and the model nodes. Optionally, the one or more processors execute the instructions to reduce a weight for a link between the first user node and a second user node when the second user downloads the first model and the first model is published by the first user. Optionally, the one or more processors execute the instructions to reduce a weight for a link between the first user node and a second user node when the first user answers a question asked by the second user. Optionally, the one or more processors execute the instructions to compute weights for additional links between pairs of the user nodes and community nodes, and between pairs of the model nodes and the community nodes.

Optionally, in any of the preceding embodiments, the knowledge network platform is implemented in a cloud environment.

Optionally, in any of the preceding embodiments, the selecting comprises computing products for the first model node, wherein each product in the products is computed by multiplying the model dissimilarity value for each one of the model pairs and the path length for a shortest path between the first model node and one of the other model nodes that represents the different model. Optionally, the at least one model included in the recommendation includes at least one model that is associated with a product of the products having a value less than a threshold value.

Optionally, in any of the preceding embodiments, the one or more processors execute the instructions to compute the model dissimilarity values based on model characteristics, and each model dissimilarity value in the model dissimilarity values corresponds to one of the different models as compared to the first model. Optionally, the model characteristics include algorithm type, algorithm class, and a number of features.

To this end, in some optional embodiments, one or more of the foregoing features of the aforementioned apparatus, system and/or method may enable the recommendation of one or more models for a user based on a combination of knowledge interaction between the users of the knowledge network platform and similarity (or dissimilarity) of the models in the knowledge network platform.

It should be noted that the aforementioned potential advantages are set forth for illustrative purposes only and should not be construed as limiting in any manner.

DETAILED DESCRIPTION

Models may be shared using a knowledge network platform for machine learning knowledge. In one embodiment, the knowledge network platform may be a cloud managed knowledge network platform. The knowledge network platform provides an ecosystem for users, scientists, engineers, and verification testers of a machine learning model. Through the knowledge network platform, the users, scientists, and engineers can personalize models for specific applications and servers, and can efficiently develop and extend knowledge.

Sharing of knowledge may be facilitated by employing a social "follow" mechanism to obtain the knowledge that best matches a user's interests and is most similar to knowledge the user has produced or acquired, rather than obtaining the knowledge through traditional software or content update mechanisms. In one embodiment, the "follow" mechanism enables direct exchange of knowledge in a secure channel without reliance on a central deployment channel. In the context of the following description, knowledge primarily refers to machine learning models and model metadata. However, knowledge is not limited to machine learning models and may apply to other knowledge contents. In addition, knowledge can apply to any types of knowledge and related contents without limitation.

Figure 1:
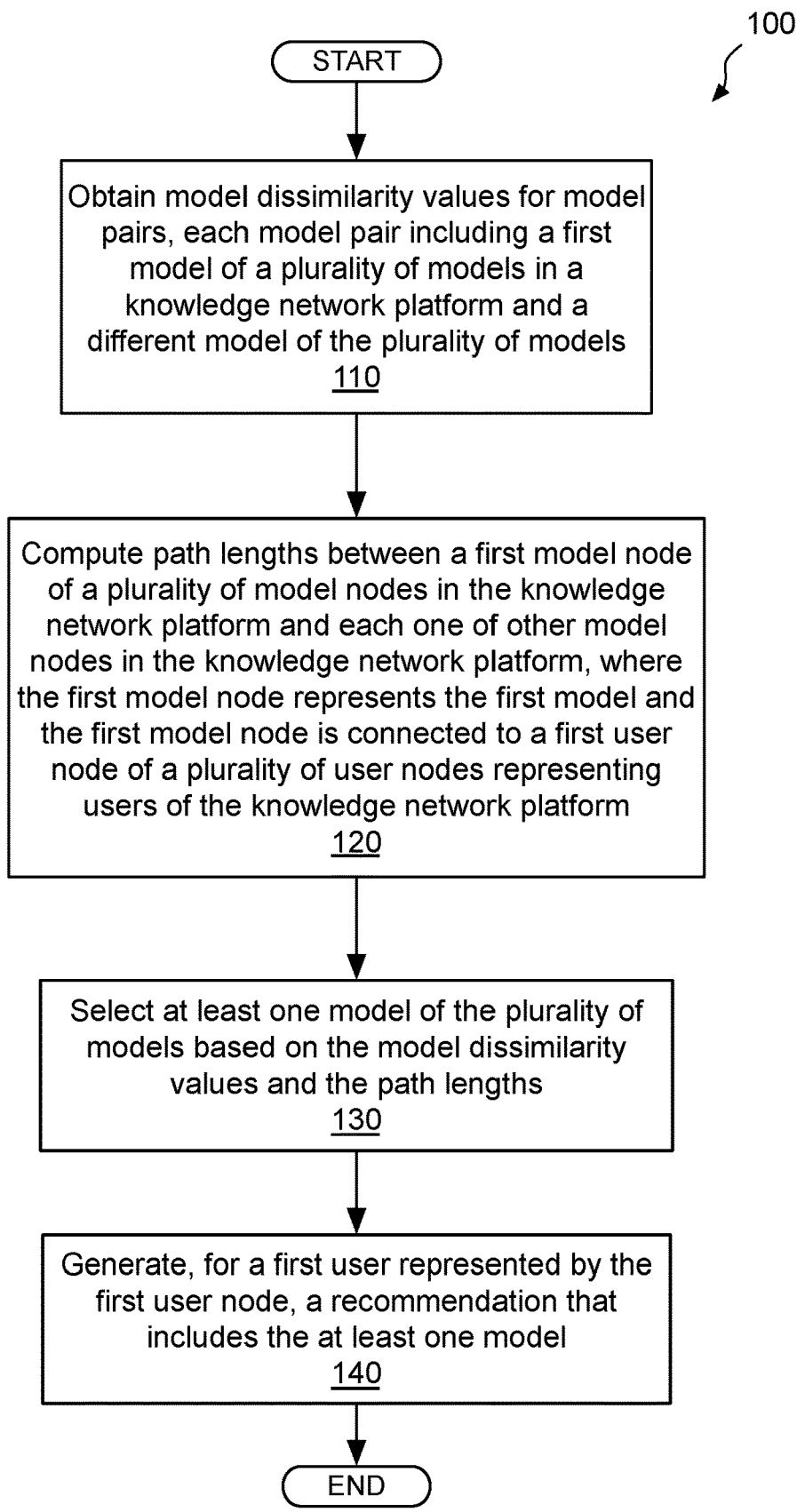
FIG. 1 illustrates a method for managing a knowledge network platform, in accordance with one embodiment.

FIG. 1 illustrates a method 100 for managing a knowledge network platform, in accordance with one embodiment. As an option, the method 100 may be implemented in the context of any one or more of the embodiments set forth in any previous and/or subsequent figure(s) and/or the description thereof. For example, in one possible embodiment, the method 100 may be implemented in the context of the managed knowledge network platform 200 of FIG. 2. However, it is to be appreciated that the method 100 may be implemented in other suitable environments.

As shown, in operation 110, model dissimilarity values are obtained for model pairs, each model pair including a first model of a plurality of models in a knowledge network platform and a different model of the plurality of models. In one embodiment, each model dissimilarity value of the model similarity values is calculated based on model characteristics (i.e., attributes or properties) and corresponds to one of the different models as compared with the first model. In another embodiment, a model similarity value is used to compute a dissimilarity value between two models, and the dissimilarity value for a model pair is the reciprocal of the similarity value, where a smaller dissimilarity value means the two models are more similar. A higher model similarity value for a model pair means the two models are more similar and a higher model dissimilarity value for a model pair means the two models are less similar.

In one embodiment, a knowledge network is represented by a node graph (e.g., social network), where model nodes correspond to the models and the user nodes correspond to the users of the managed knowledge network platform. In operation 120, path lengths between a first model node of a plurality of model nodes in the knowledge network platform and each one of other model nodes in the knowledge network platform are computed. The first model node represents the first model and the first model node is connected to a first user node of a plurality of user nodes representing users of the knowledge network platform through one or more links (i.e., edges). A link is added between two nodes when a knowledge-based interaction occurs between the two nodes. Examples of interactions include a user joining a community, a user publishing a model, a user downloading a model, a user answering a question, etc.

In one embodiment, the node graph is constructed and maintained by the knowledge network platform. The node graph may include user nodes, model nodes, and community nodes. In the context of the following description, a path may traverse one or more links between two user nodes, a user node and a model node, a user node and a community node, two model nodes, a model node and a community node, or two community nodes. In one embodiment, each link in a path between two nodes is associated with a weight and the length of the path is computed based on the weights of the links in the path. In one embodiment, the path length between two nodes is inversely related to an interaction level between the two nodes. In other words, a smaller length of a path between two users means to two users have had several interactions.

In operation 130, at least one model of the plurality of models is selected based on a combination of the model dissimilarity values and the path lengths. Importantly, two different factors, namely model dissimilarity values and the path lengths, determine the at least one model that is selected. The model dissimilarity and similarity values are independent of the node graph and depend on attributes of the models. In contrast, the path lengths are computed based on the weights of the links in each path. The weights are based on user behavior and user interaction with the knowledge network. In other words, the weights indicate knowledge-based interaction. Therefore, if the first user downloaded a second model published by a second user, a third model that is also published by the second user may be selected for inclusion in a recommendation to the first user because a short path exists between the first user node and the second model node through the second user node. However, the model dissimilarity (or similarity) value for the first model and the second model node may not indicate that the first and second users have interacted. In another example, a fourth model may be added to the knowledge network by a third user and no path may connect the first user to the third user. However, because the model dissimilarity value for the first model and the fourth model indicates attributes of the models are similar, the fourth model may be selected for inclusion in the recommendation to the first user.

In operation 140, a recommendation that includes the at least one model is generated for a first user represented by the first user node. In one embodiment, a list of models is ordered according to decreasing neighbor value and one or more of the models at the top of the list are included in the recommendation. In one embodiment, the neighbor value is a combination of the shortest path length between two model nodes and a dissimilarity value for the two models (i.e., model pair) represented by the two model nodes. In one embodiment, a fixed number of the one or more models are included in the recommendation. In one embodiment, a number of the one or more models included in the recommendation is determined based on a neighbor value threshold.

More illustrative information will now be set forth regarding various optional architectures and uses in which the foregoing technique may or may not be implemented, in accordance with other embodiments. It should be strongly noted that the following information is set forth for illustrative purposes and should not be construed as limiting in any manner. Any of the following features may be optionally incorporated with or without other features described.

Figure 2:
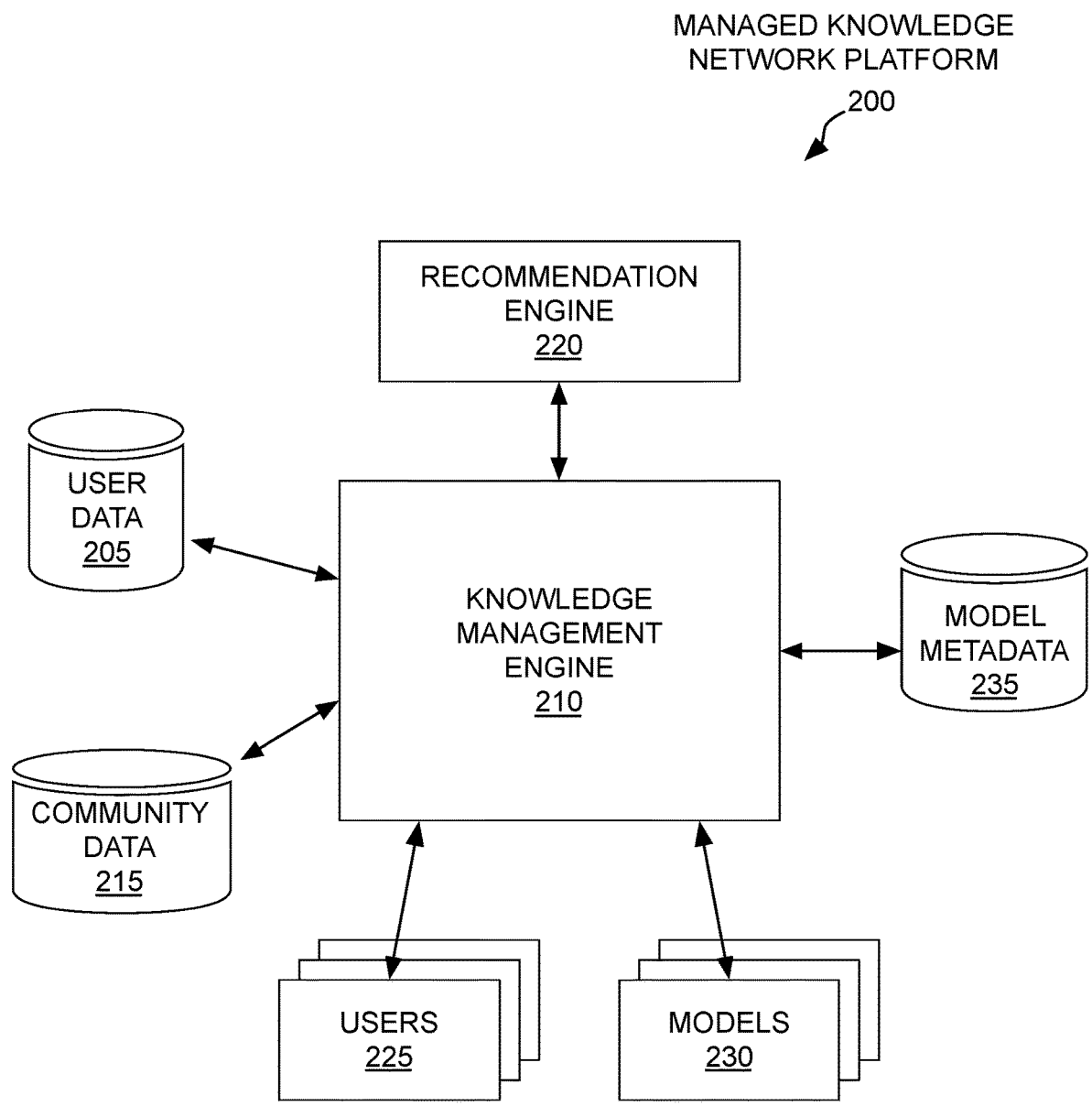
FIG. 2 illustrates a managed knowledge network platform, in accordance with one embodiment.

FIG. 2 illustrates a managed knowledge network platform 200, in accordance with one embodiment. As shown, the knowledge network platform 200 is a system that includes a knowledge management engine 210, a recommendation engine 220, user data storage 205, community data storage 215, users 225, and models 230. In one embodiment, the knowledge management engine 210 and the recommendation engine 220 may be implemented by an apparatus, comprising a non-transitory memory storing instructions and one or more processors in communication with the non-transitory memory, where the one or more processors execute the instructions to perform the operations shown in FIG. 1. In one embodiment, the managed knowledge network platform 200 is implemented in a cloud environment. It should be noted that the communication between the foregoing components of the managed knowledge network platform 200 may be afforded by way of any type of networking (e.g. bus networks, local networks, remote networks, etc.).

Further, while the various components are shown to be separate and discrete in one possible embodiment, other optional embodiments are contemplated where one or more components (or even all) are integrated in a single component. To this end, each of the illustrated components of the knowledge network platform 200 may include any combination of software and/or hardware capable of performing their intended tasks that will be elaborated upon below, and may or may not share underlying hardware with one or more of the other components of the knowledge network platform 200. The illustrated components can communicate with each other using one or more data communication networks such as, for example, the Internet. More information will now be set forth regarding each of the foregoing components and the interoperability thereof.

As shown, data for one or more communities is stored in a data storage means in the form of the community data storage 215, where each model in the models 230 is associated with a community. Examples of communities include machine translation, image recognition, fraud detection, weather forecasting, stock prediction, cancer detection, etc. Each community may have a hierarchical structure with two or more layers of sub-communities. For example, sub-communities within a fraud detection community may include credit card fraud, insurance fraud, telecom fraud, etc. Portions of the communities overlap when at least one sub-community is shared between at least two communities.

The users 225 join the managed knowledge network platform 200 and may complete a profile specifying their interests. As shown, user profiles are stored in a data storage means in the form of the user data storage 205. Each user 225 may be a member of one or more communities, publish one or more models 230, subscribe to one or more models 230, like one or more models 230, download one or more models 230, ask a question in a community, answer a question, etc. Each user profile stored in the user data storage 205 may include names of models 230 published by the user 225, communities the user 225 joined, names of models 230 downloaded by the user 225, names of models 230 the user 225 has subscribed to, names of models 230 the user 225 has liked, questions the user 225 has asked, answers the user 225 has provided, etc.

As shown, an abstract representation of each model 230 is stored in a data storage means in the form of the model metadata storage 235. The abstract representation may include attributes such as a name (i.e., unique identifier), the algorithm type, the algorithm, the number of features, the features (e.g., name and type, such as integer, float, binary, categorical, etc.), vertical area (e.g., credit card fraud, telecom fraud, securities fraud, etc.), and the like. The model metadata 235 may be used by the recommendation engine 220 to compute similarity and/or dissimilarity values for pairs of models in the models 230. In one embodiment, similarity and/or dissimilarity values are not computed for pairs of models that are published by the same user 225. Example algorithm types include classification, clustering, deep neural network (DNN), convolutional neural network (CNN), and recurrent neural network (RNN). Example classification algorithms include logistic regression, linear regression, decision tree, support vector machine (SVM), k-nearest neighbors (KNN), Naïve Bayes, and random forest.

In one embodiment, the knowledge management engine 210 constructs and maintains a node graph representing the knowledge network. In various embodiments, the knowledge management engine 210 may include, but is not limited to at least one processor and any software controlling the same, and/or any other circuitry capable of the aforementioned functionality. The recommendation engine 220 may use the node graph to compute path lengths between different nodes in the node graph. In particular, the recommendation engine 220 may compute lengths of paths from a user 225 to a model node that is not published by the user 225 when creating a list from which models 230 are selected for inclusion in a recommendation for the user 225. In various embodiments, the recommendation engine 220 may include, but is not limited to at least one processor and any software controlling the same, and/or any other circuitry capable of the aforementioned functionality.

In one embodiment, the recommendation engine 220 generates recommendations for users of the knowledge network platform by multiplying each path length by a dissimilarity value to compute neighbor values. In one embodiment, the dissimilarity value is computed as the reciprocal of the similarity value, and a smaller dissimilarity value means two models 230 are more similar (0=the same model). The path length for a pair of model nodes is computed as the sum of weights of each link along path between the pair of model nodes. When multiple paths exist between the pair of model nodes, the shortest path is used to compute the neighbor value.

The knowledge network platform 200 provides a knowledge-specific system where knowledge providers, subscribers and other contributors (i.e., the users 225) can form and join a specific community. In one embodiment, the knowledge management engine 210 includes a network extensible component for connecting other types of knowledge networks for sharing and propagating knowledge. Through the knowledge network platform 200, the users 225 can subscribe to their desired and customized knowledge content (e.g., communities and models 230). The recommendation engine 220 can provide knowledge tailored to each user 225 according to knowledge-based interactions.

Figure 3A:
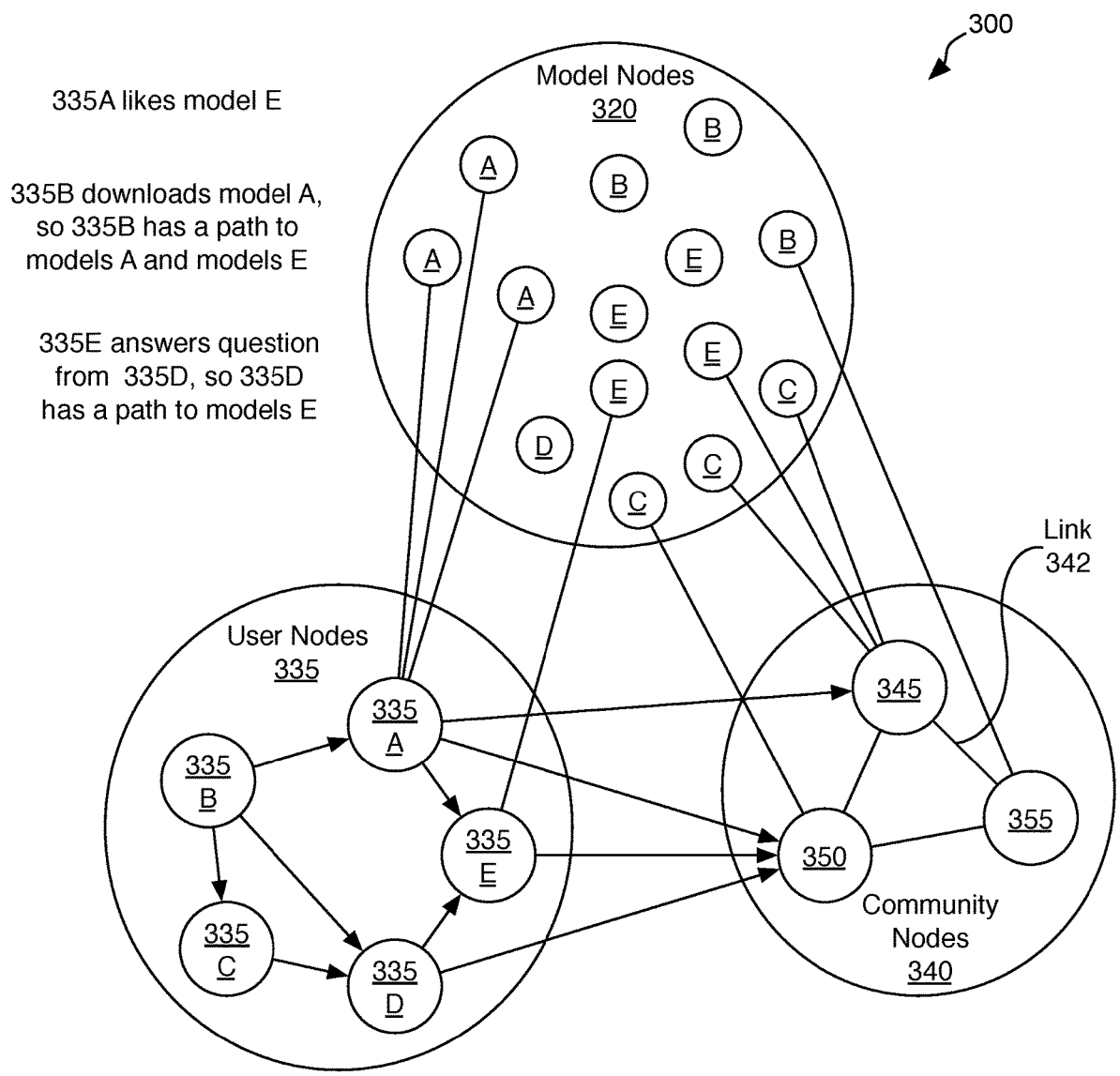
FIG. 3A illustrates a graph for a managed knowledge network platform, in accordance with one embodiment.

FIG. 3A illustrates a graph 300 for a managed knowledge network platform 200, in accordance with one embodiment. User nodes 335 includes a user node 335 for each user 225 who joins the managed knowledge network platform 200. Community nodes 340 includes community nodes 345, 350, and 355 that each represent a separate community. The users 225 can join or become a member of one or more communities or sub-communities. In one embodiment, the users 225 can also create new communities or sub-communities. A link between two communities, such as the link 342 between the community nodes 345 and 355 indicates that at least a portion of the communities overlap. For example, at least one sub-community is included in both communities 345 and 355.

Model nodes 320 includes model nodes A, B, C, D, and E, where each node represents a separate model 230 that is published by a user 225. The model nodes A are published by the user represented by the user node 335A. The model nodes B are published by the user node 335B. The model nodes C are published by the user node 335C. The model nodes D are published by the user node 335D. The model nodes E are published by the user node 335E. Two of the model nodes C representing models 230 published by the user 225 represented by the user node 335C are connected to the community node 335. Therefore, the two model nodes C are published in the community represented by the community node 335. In one embodiment, links between model nodes 320 and community nodes 340 are bidirectional. The third model node C is connected to the community node 350 by a bidirectional link. The third model 230 published by the user 225 represented by the user node 335 is published in a different community than the other two models 230 published by the same user 225. Some of the links between the model nodes 320 and the community nodes 340 are not shown in FIG. 3A.

Each model node 320 connected to the user 225 who published the model 230 represented by the model node 320. The letter label of a model node 320 indicates the user node 335 that is connected to the model node 320. Some of the links between the model nodes 320 and the user nodes 335 are not shown in FIG. 3A. In one embodiment, links between model nodes 320 and user nodes 335 are bidirectional.

When a user 225 subscribes to or joins a community, a unidirectional link is added from the user node 335 representing the user 225 to the community node 345, 350, or 355. For examples links are added between the user node 335A and the community nodes 345 and 350, between the user node 335E and the community node 350, and between the user node 335D and the community node 350. Some of the links between the user nodes 335 and the community nodes 340 are not shown in FIG. 3A. Specifically, a link between the user node 335B and the community node 355 and links between the user node 335C and community nodes 350 and 345 are not shown in FIG. 3A.

A unidirectional link between two user nodes 335 is added to the graph 300 when a user 225 downloads a model 230 published by another user 225. For example, a unidirectional link is added from the user node 335B to the user node 335A when the user 225 represented by the user node 335B downloads a model 230 represented by a model node A. A unidirectional link between two user nodes 335 is also added to the graph 300 when a user 225 likes a model 230 published by another user 225. For example, a unidirectional link is added from the user node 335A to the user node 335E when the user 225 represented by the user node 335A likes a model 230 represented by a model node E. A unidirectional link between two user nodes 335 is also added to the graph 300 when a user 225 subscribes to a model 230 published by another user 225. In one embodiment, a user 225 who has subscribed to a model 230 will receive a notification from the recommendation engine 220 whenever the model 230 is modified (e.g., a new dataset for training is added, the features are changed, etc.), another user downloads the model 230, the user 225 who published the model 230 published another model 225, etc.

A unidirectional link between two user nodes 335 is also added to the graph 300 when a user 225 answers a question asked by another user 225. For example, a unidirectional link is added from the user node 335D to the user node 335E when the user 225 represented by the user node 335E answers a question asked by the user 225 represented by the user node 335D. The question was asked in the community represented by the community node 350 to which both users 225 represented by the user nodes 335D and 335E subscribe. In one embodiment, when a unidirectional link is added between two user nodes 335, the weight of the link is initialized to a predetermined value. In one example, the predetermined value is 1.

When a unidirectional link already exists between two user nodes 335 an interaction has occurred between the two users 225 represented by the two user nodes 335. When a subsequent interaction (i.e., link event) occurs, the weight of the link is updated. Examples of link events include downloading a model 230, subscribing to a model 230, liking a model 230, and answering a question. A user 225 who has published a model 230 is referred to as a source user that is represented by a source user node 335. In one embodiment, the weight of a link between a source user node 335 and another user node 335 is reduced by 1/α each time a user 225 downloads an additional model 230 published by the source user 225 that is represented by the source user node 335. For example, a weight of the unidirectional link from the user node 335B to the source user node 335A is reduced by 1/α when the user 225 represented by the user node 335B downloads a model 230 represented by an additional model node A. Note that the term "source" is relative. For example, the user node 335A is a source user node relative to the user node 335B, whereas the user node 335E is a source user node relative to the user node 335A.

In one embodiment, the weight of a link between a source user node 335 and another user node 335 is reduced by 1/ω each time a user 225 subscribes to an additional model 230 published by the source user 225 that is represented by the source user node 335. In one embodiment, the weight of a link between a source user node 335 and another user node 335 is reduced by 1/γ each time a user 225 likes an additional model 230 published by the source user 225 that is represented by the source user node 335. For example, a weight of the unidirectional link from the user node 335A to the user node 335E is reduced by 1/γ when the user 225 represented by the user node 335A likes a model 230 represented by an additional model node E.

In one embodiment, the weight of a link between a source user node 335 and another user node 335 is reduced by 1/β each time a user 225 answers an additional question asked by another user 225. For example, a weight of the unidirectional link from the user node 335D to the user node 335E is reduced by 1/β when the user 225 represented by the user node 335E answers an additional question asked by the user 225 represented by the user node 335D.

Figure 3B:
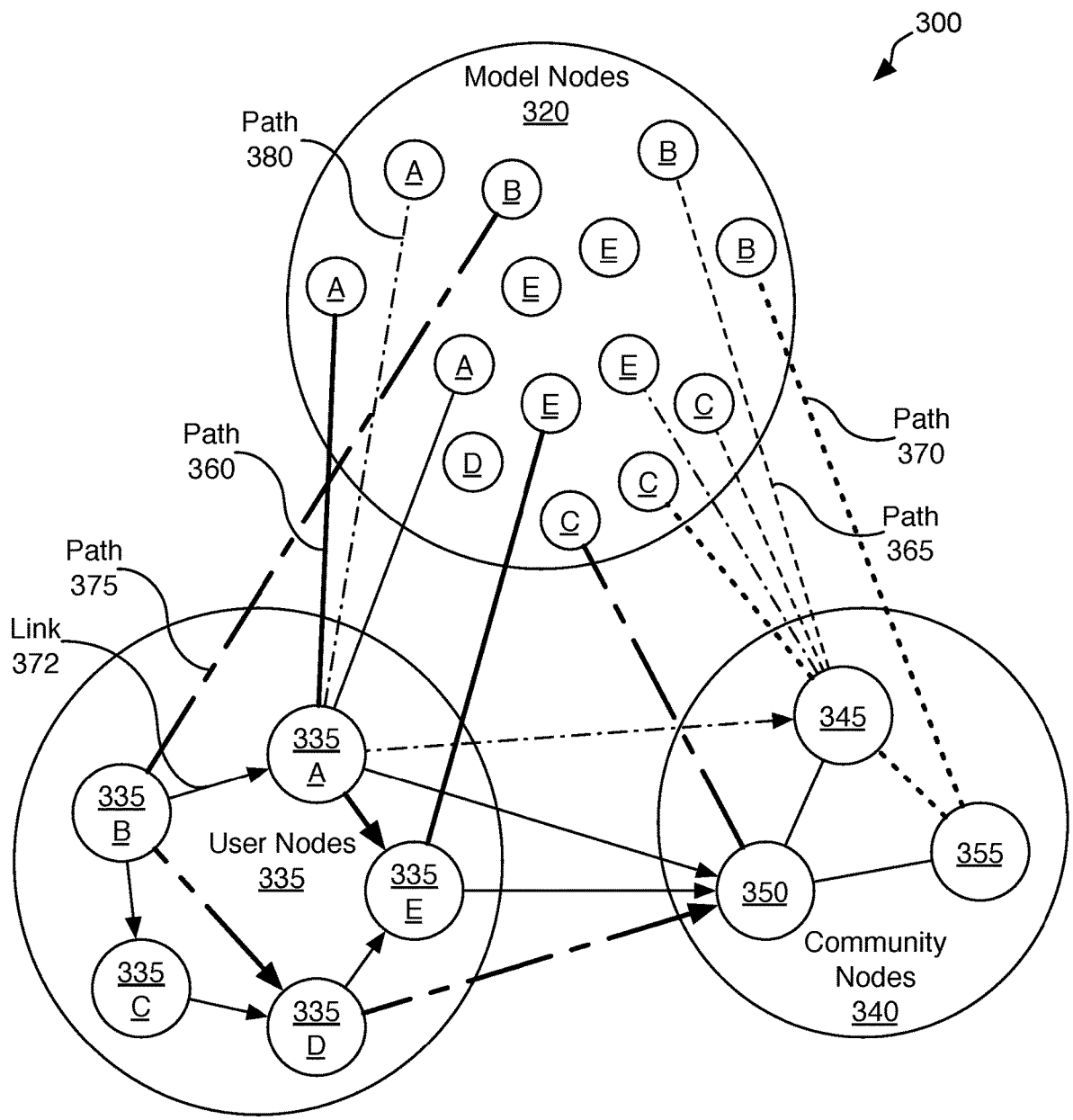
FIG. 3B illustrates paths in the graph shown in FIG. 3A, in accordance with one embodiment.

FIG. 3B illustrates paths in the graph 300 shown in FIG. 3A, in accordance with one embodiment. A path 360 connects a first model node A linked to the source user node 335A and a first model node E linked to the user node 335E. The link from the user node 325A to the user node 335E may have been added when the user 225 represented by the user node 325A downloaded or liked a first model 230 published by the source user 225 represented by the source user node 325E. A length of the path 360 is computed for selecting one or more models for inclusion in a recommendation for the user 225 represented by the user node 335A. In particular, the unidirectional link from the user node 335A to the source user node 335E provides paths between the first model node A and each of the other model nodes E.

Another unidirectional link 372 from the user node 335B to the user node 335A provides a connection from the user node 335B and the user node 335A. Therefore, as the weights of the link from the user node 325A to the user node 335E is reduced, the recommendation engine 220 may select the first model 230 represented by the first model node E for inclusion in a recommendation for the user 225 represented by the user node 335B.

A path 365 connects a first model node B linked to the community node 345 and a model node C linked to the community node 345. In one embodiment, the weight of the link between the first model node B and the community node 345 is constant and the weight of the link between the model node C linked to the community node 345 is also a constant. In one embodiment, the constant is 1. A length of the path 365 is computed for selecting one of more models for inclusion in a recommendation for the users 225 represented by the user nodes 335B and 335C because the links between the first model nodes B and C and the community node 345 are bidirectional. Specifically, paths (not shown) are available from the other model nodes B through the user node 335B and the community node 345 to the other model nodes C. Similarly, paths (not shown) are available from the other model nodes C through the user node 335C and the community node 345 to the other model nodes B.

A path 370 connects a second model node B linked to the community node 355 and a second model node C linked to the community node 355 through a bidirectional link between the community nodes 345 and 355. A length of the path 370 is computed for selecting one of more models 230 for inclusion in a recommendation for the users 225 represented by the user nodes 335B and 335C. In one embodiment, the weight of the link between the first model node B and the community node 345 is constant and the weight of the link between the model node C linked to the community node 355 is also a constant. In one embodiment, the constant is 1. A weight of the bidirectional link between community nodes 345 and 355 is computed as 1−J(P,Q), where J is the Jaccard index between communities P and Q. The Jaccard index is computed as the ratio of the intersection between communities P and Q and the union of the communities P and Q.

$$J(P, Q) = \left|\frac{P \cap Q}{P \cup Q}\right| = \frac{|P \cap Q|}{|P| + |Q| - |P \cap Q|}$$

Therefore, the weight of a link between the community nodes 345 and 355 decreases and the ratio approaches a value of 1. In other words, as the intersection of the two communities increases towards the union of the two communities, the weight of the link is reduced.

A path 375 connects a third model node B linked to the user node 335B through a unidirectional link from the user node 335B to the user node 335D, where the user node 335D is connected to a third model node C linked to the community node 350. A length of the path 375 is computed for selecting at least the model 230 represented by the third model node C for inclusion in a recommendation for the user 225 represented by the user node 335B. The bidirectional links included in the path 375 each have a weight of 1 and the weight of the link from the user node 335B to the source user node 335E may be less than one.

A path 380 connects a second model node A to a second model node E, through the user node 335A, a unidirectional link from the user node 335A to the community node 345, and a bidirectional link between the community node 345 and the second model node E. A length of the path 380 is computed for selecting at least the model 230 represented by the second model node E for inclusion in a recommendation for the user 225 represented by the user node 335A.

Figure 4A:
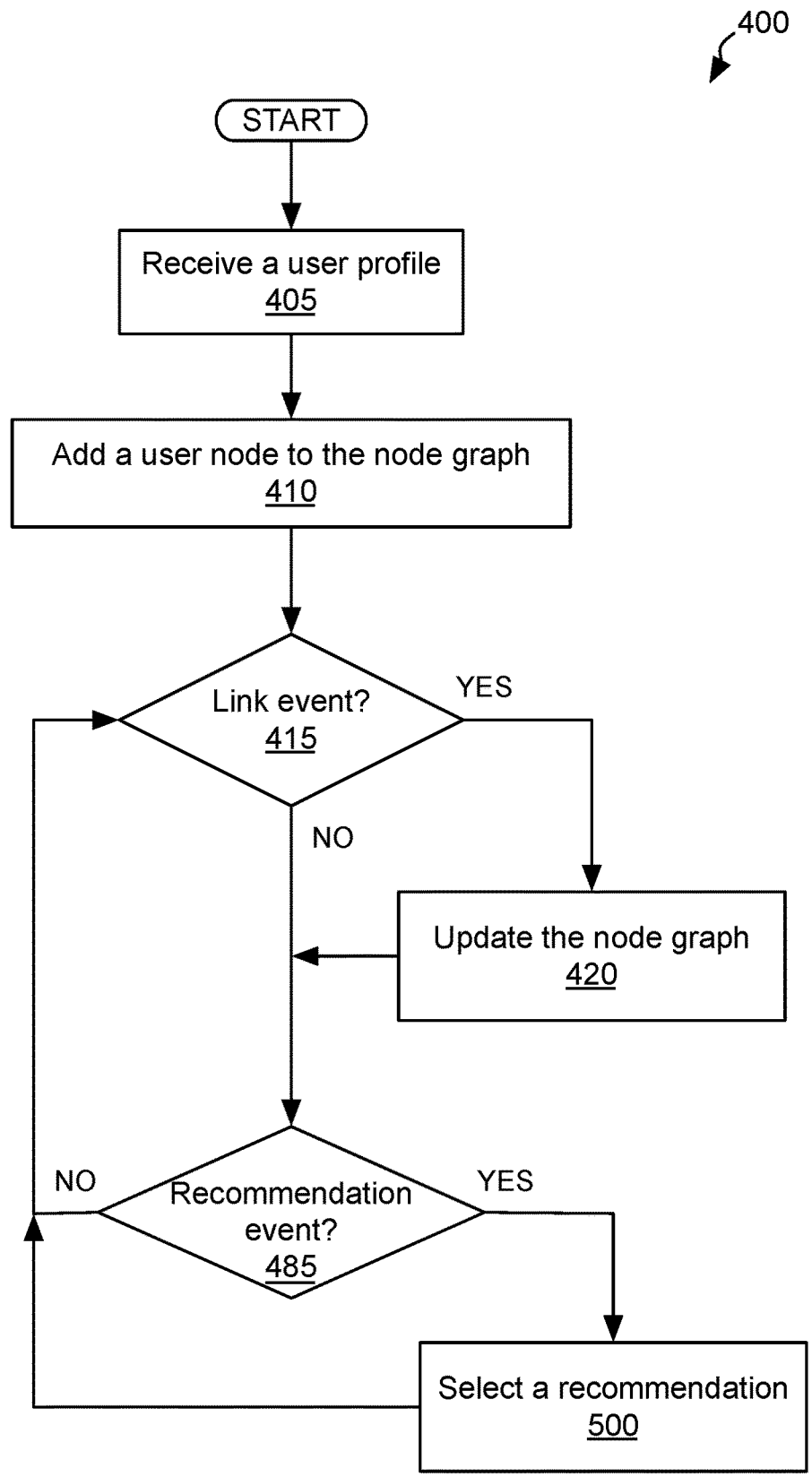
FIG. 4A illustrates a method for selecting a recommendation for a user of the knowledge network platform shown in FIG. 2, in accordance with one embodiment.

FIG. 4A illustrates a method 400 for selecting a recommendation for a user 225 of the knowledge network platform 200 shown in FIG. 2, in accordance with one embodiment. The method 400 is performed for each user 225 that joins the knowledge network platform 200. Therefore one or more methods 400 may be executed simultaneously, where each instance of a method 400 is associated with a particular user 225. As an option, the method 400 may be implemented in the context of any one or more of the embodiments set forth in any previous and/or subsequent figure(s) and/or the description thereof. For example, in one possible embodiment, the method 400 may be implemented in the context of the managed knowledge network platform 200 of FIG. 2. However, it is to be appreciated that the method 400 may be implemented in other suitable environments.

As shown, in operation 405, a user profile is received by the knowledge network platform 200. In one embodiment, the knowledge management engine 210 stores the user profile in the user data storage 205. Initially, when the user 225 joins the knowledge network platform 200, the user profile may include a name or identifier for the user 225. As the user 225 interacts with the knowledge network platform 200, the user profile is updated by the knowledge management engine 210 and/or the recommendation engine 220.

In operation 410, the knowledge management engine 210 adds a user node 335 to the graph 300, where the user node 335 represents the user 225. In one embodiment, the knowledge management engine 210 stores a reference to the user node 335 in the user profile.

In operation 415, the knowledge management engine 210 determines if a link event has occurred, and if not, then the knowledge management engine 210 proceeds to operation 485. Otherwise, in operation 420, the knowledge management engine 210 updates the node graph 400 based on the link event and proceeds to operation 485. For example, a new link may be added between two nodes, a weight of a link may be updated, and a model node 320 may be added to the node graph 400. Further details of the operation 420 are described in conjunction with FIGS. 4B and 4C.

In operation 485, the recommendation engine 220 determines if a recommendation event has occurred, and, if not, then the recommendation engine 220 returns to operation 415. Note that operations 415 and 485 are independent of each other and may be performed simultaneously. In one embodiment, the order of operations 415 and 485 is reversed. Examples of recommendation events include expiration of a timer, addition of a new model 230 to the managed knowledge network platform 200, and a link event. In operation 500, a recommendation is selected for the user 225 before the recommendation engine 220 returns to operation 415. Further details of the operation 500 are described in conjunction with FIG. 5.

Figure 4B:
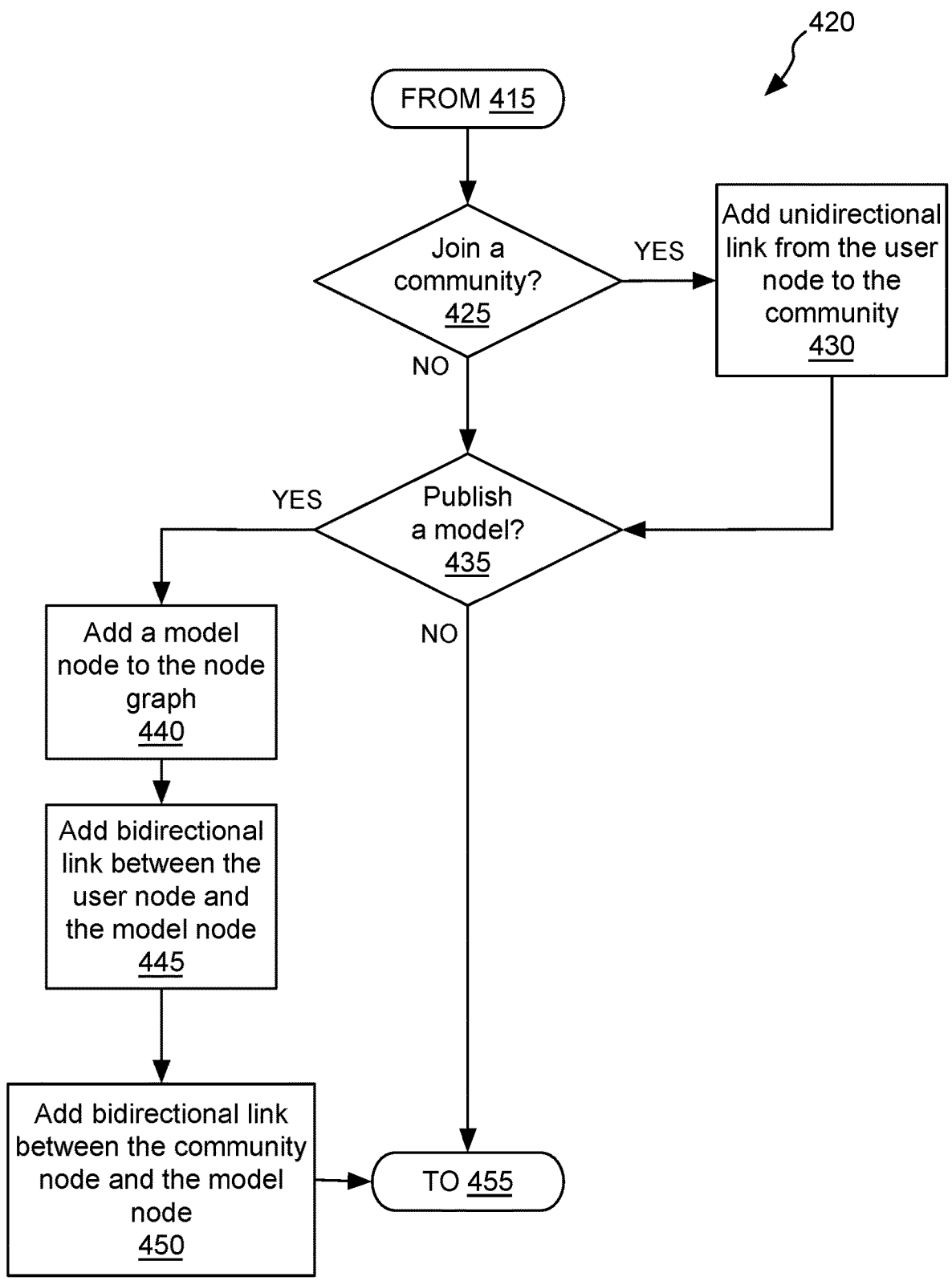
FIGS. 4B and 4C illustrate an operation of the method shown in FIG. 4A, in accordance with one embodiment.
Figure 4C:
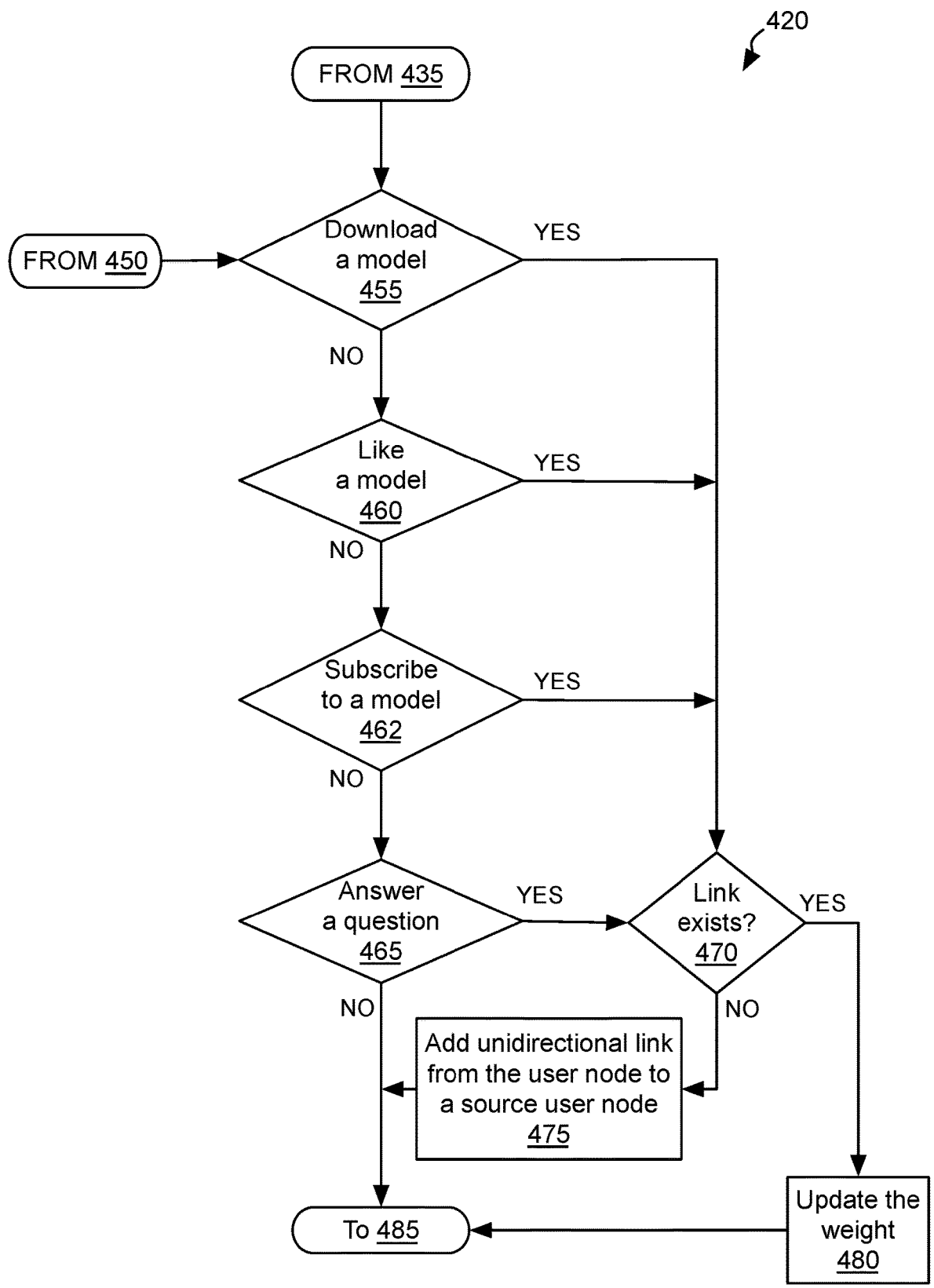

FIGS. 4B and 4C illustrate the operation 420 of the method 400 shown in FIG. 4A, in accordance with one embodiment. In operation 425, the knowledge management engine 210 determines if the user 225 has joined a community, and, if not, then the knowledge management engine 210 proceeds to operation 435. Otherwise, in operation 430, the knowledge management engine 210 updates the node graph 400 by adding a unidirectional link from the user node 335 representing the user 225 to the community node 345, 350, or 355 that represents the joined community and proceeds to operation 435. In one embodiment, the knowledge management engine 210 initializes a weight of the unidirectional link added in operation 430 to a value of one. In one embodiment, after completing operation 430, the knowledge management engine 210 proceeds to operation 485. In one embodiment, if the user 225 has added a new community to the managed knowledge network platform 200, the knowledge management engine 210 adds a new community node to the node graph 300 before completing operation 430.

In operation 435, the knowledge management engine 210 determines if the user 225 has published a new model 230, and, if not, then the knowledge management engine 210 proceeds to operation 455 shown in FIG. 4C. Otherwise, in operation 440, the knowledge management engine 210 updates the node graph 400 by adding a new model node 320 to the node graph 300. In operation 445, the knowledge management engine 210 adds a bidirectional link between the user node 335 representing the user 225 and the new model node 320. In one embodiment, the knowledge management engine 210 initializes a weight of the bidirectional link added in operation 445 to a value of one. When the user 225 publishes the new model 230, the user 225 also specifies a community in which the new model 230 is published. In operation 450, the knowledge management engine 210 adds a bidirectional link between the community node 345, 350, or 355 that represents the specified community and the new model node 320, and then proceeds to operation 455 shown in FIG. 4C. In one embodiment, after completing operation 450, the knowledge management engine 210 proceeds to operation 485.

In operation 455, the knowledge management engine 210 determines if the user 225 has downloaded a model 230 published by a source user 225, and, if not, then the knowledge management engine 210 proceeds to operation 460. Otherwise, in operation 470, the knowledge management engine 210 determines if a link exists between the user 225 and the source user 225. If a link does not exist, then at operation 475 the knowledge management engine 210 updates the node graph 400 by adding a unidirectional link from the user node 335 representing the user 225 to the source user node 335 and proceeds to operation 485.

In one embodiment, the knowledge management engine 210 initializes a weight of the unidirectional link added in operation 475 to a value of one. If, in operation 470, the knowledge management engine 210 determines that a link exists between the user 225 and the source user 225, then at operation 480, the knowledge management engine 210 updates the weight associated with the unidirectional link from the user node 335 representing the user 225 to the source user node 335 and proceeds to operation 485. In one embodiment, the knowledge management engine 210 proceeds to operation 460 after operation 475 or 480. In one embodiment, the weight is reduced when the knowledge management engine 210 updates the weight.

In operation 460, the knowledge management engine 210 determines if the user 225 has liked a model 230 published by a source user 225, and, if not, then the knowledge management engine 210 proceeds to operation 462. Otherwise, the knowledge management engine 210 proceeds to operation 470 and completes either operation 475 or 480, as previously described. In operation 462, the knowledge management engine 210 determines if the user 225 has subscribed to a model 230 published by a source user 225, and, if not, then the knowledge management engine 210 proceeds to operation 465. Otherwise, the knowledge management engine 210 proceeds to operation 470 and completes either operation 475 or 480, as previously described. In one embodiment, in operation 470, the knowledge management engine 210 determines if a link exists between the user 225 and the model 230 that was downloaded, liked, or subscribed to by the user 225. If a link between the user node 335 representing the user 225 and the model node 335 representing the model 230 does not exist, then at operation 475 the knowledge management engine 210 updates the node graph 400 by adding a unidirectional link from the user node 335 to the model node 335 and proceeds to operation 485.

If, in operation 465, the knowledge management engine 210 determines that the user 225 has answered a question asked by another user 225, then in operation the knowledge management engine 210 proceeds to operation 470. When the user 225 answers the question asked by another user 225, the user node 235 is considered by the knowledge management engine 210 to be the source user node 235 for operation 470 and either operation 475 or 480, as previously described. If, in operation 465, the knowledge management engine 210 determines that the user 225 has not answered a question asked by another user 225, then the knowledge management engine 210 proceeds to operation 485.

In one embodiment, one or more of operations 425, 435, 455, 460, 462, and 465 are simultaneously performed by the knowledge management engine 210. Similarly, in one embodiment, one or more of operations 430, 440, 445, 450, 475, and 480 are simultaneously performed by the knowledge management engine 210.

Figure 5:
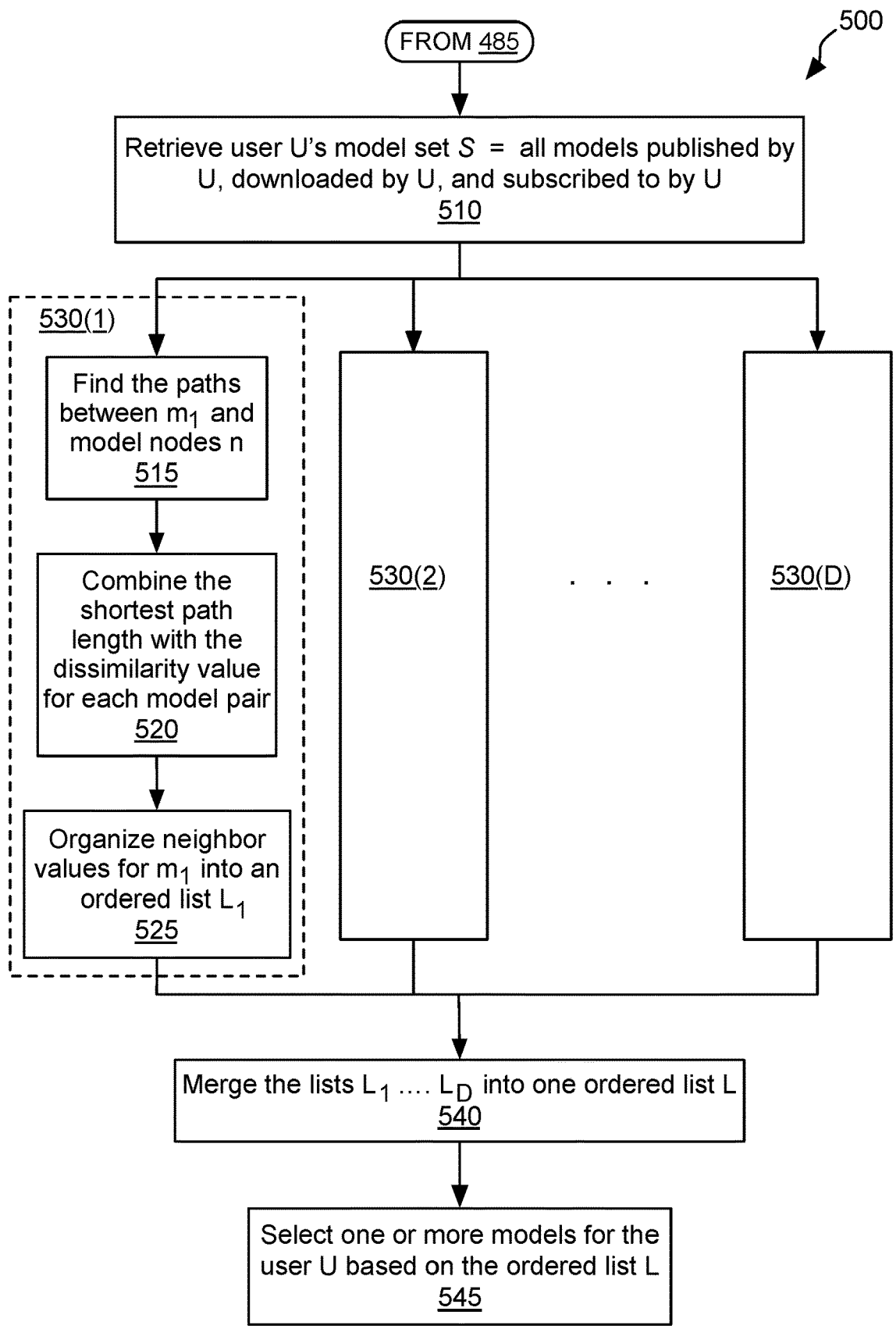
FIG. 5 illustrates another operation of the method shown in FIG. 4A, in accordance with one embodiment.

FIG. 5 illustrates the operation 500 of the method 400 shown in FIG. 4A, in accordance with one embodiment. In operation 500, the recommendation engine 220 selects one or more models 230 for inclusion in a recommendation for a user 225. The method 500 is performed for each user 225 in the knowledge network platform 200. Therefore one or more methods 500 may be executed simultaneously, where each instance of a method 500 is associated with a particular user 225. As an option, the method 500 may be implemented in the context of any one or more of the embodiments set forth in any previous and/or subsequent figure(s) and/or the description thereof. For example, in one possible embodiment, the method 500 may be implemented in the context of the managed knowledge network platform 200 of FIG. 2. However, it is to be appreciated that the method 500 may be implemented in other suitable environments.

In operation 510, the recommendation engine 220 retrieves a model set S for a user 225, referred to as user U. In one embodiment, the model set S for a user U includes all models 230 published by user U, downloaded by user U, or subscribed to by user U. Operation 530 is performed by recommendation engine 220 for each one of models 230 referred to as $M_1, M_2, \ldots M_D$ for the user U, where D is the number of models 230 in the model set S. In the following description, the operation 530 is described for the model $M_1$, where $m_1$ is the model node 320 that represents the model $M_1$. In operation 530(1), the recommendation engine 220 generates an ordered list $L_1$ of neighbor values of model node $m_1$ based on path lengths between model node pairs $(m_1, n)$ and dissimilarity values for each model pair $(M_1, N)$. A model pair includes $M_1$ and a model 230 that is not in set S. The model nodes 320 for models 230 that are not in the set S are referred to as model nodes n and models N. The operation 530 includes operations 515, 520, and 525.

In operation 515, the recommendation engine 220 finds the paths between the model node $m_1$ and the model nodes n that are not in the set S. In operation 520, the recommendation engine 220 combines the shortest path length between the model nodes representing the models 230 in each model pair with the dissimilarity value for the model pair. As previously explained, the similarity and dissimilarity values are computed independent of the node graph 300. Details of the similarity and dissimilarity value computations are described in conjunction with FIG. 6. In one embodiment, the recommendation engine 220 combines the shortest path length with the dissimilarity value by multiplying the shortest path for each model node pair with the dissimilarity value (e.g., 1/similarity value) for the model pair. For example, for each model pair $(M_1,N)$, a neighbor value, $V(M_1,N)=A(M_1,N)$*shortest_path_length$(m_1,n)$, where n is another model node representing a model N and A is a model adjacency matrix of dissimilarity values for all model pairs.

In operation 525, the recommendation engine 220 organizes the neighbor values for the $m_1$ model node into an ordered list $L_1$. In one embodiment, the recommendation engine 220 organizes the neighbor values in increasing value and the top K neighbor values included in the ordered list $L_1$. The value of K may be fixed, programmed, or computed by the recommendation engine 220 based on one or more attributes of the node graph 300 and/or managed knowledge network platform 200.

In operation 540, the recommendation engine 220 merges the lists $L_1, L_2, \ldots L_D$ into one ordered list L. In one embodiment, recommendation engine 220 merges the lists $L_1, L_2, \ldots L_D$ by removing neighbor values for duplicate model pairs (and retaining the minimum neighbor value for each model pair) and the list L is ordered with increasing neighbor values. In operation 545, the recommendation engine 220 selects one or more models for the user U based on the ordered list L. In one embodiment, the recommendation engine 220 selects the one or more models 230 represented by the top K neighbor values in the list L.

Figure 6:
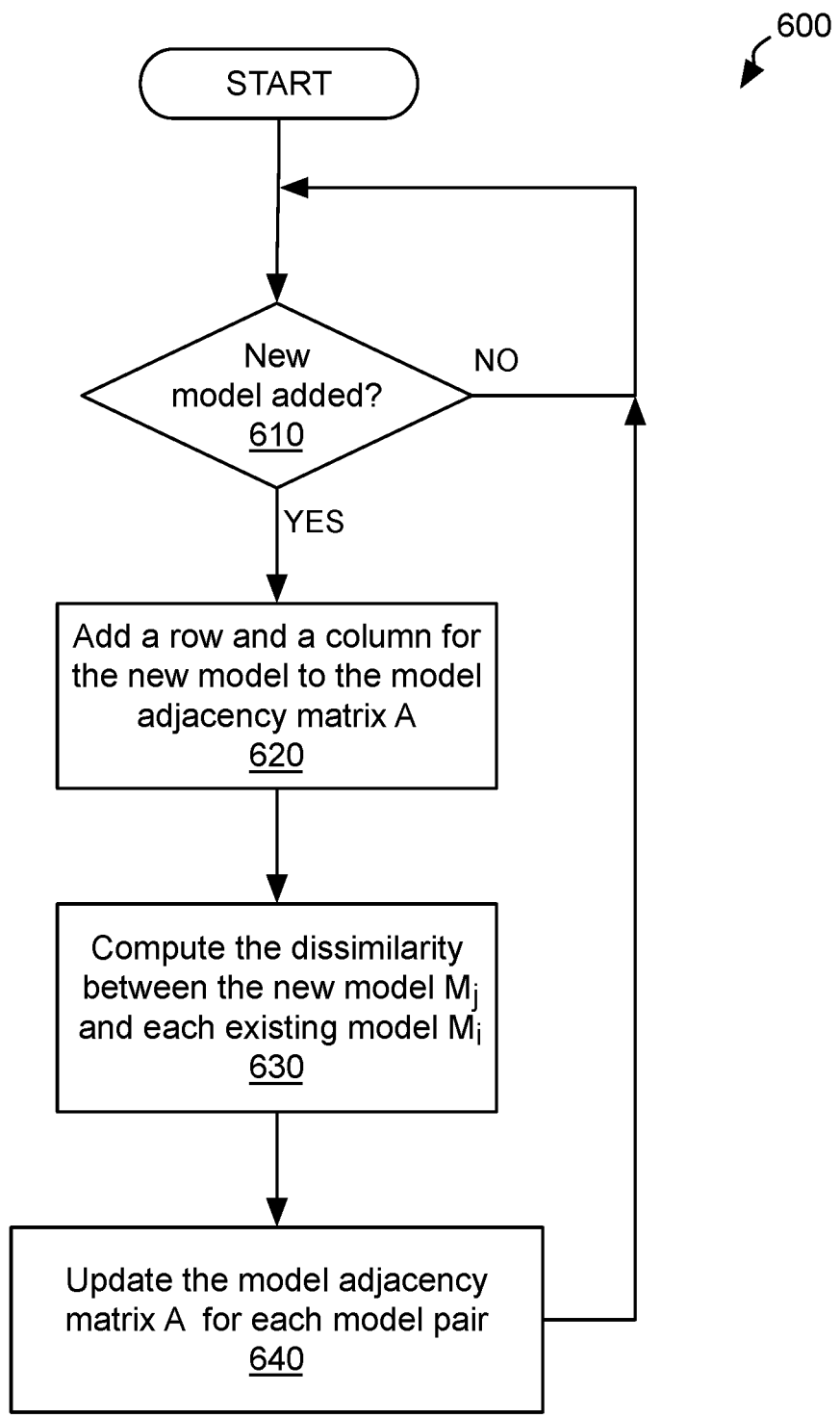
FIG. 6 illustrates a method for computing a model adjacency matrix for the managed knowledge network platform shown in FIG. 2, in accordance with one embodiment.

FIG. 6 illustrates a method 600 for computing a model adjacency matrix $A(M_i,N_j)$ for the managed knowledge network platform 200 shown in FIG. 2, in accordance with one embodiment. The method 600 is performed for each model 230 in the knowledge network platform 200. Therefore one or more methods 600 may be executed simultaneously, where each instance of a method 600 is associated with a particular model 230. As an option, the method 600 may be implemented in the context of any one or more of the embodiments set forth in any previous and/or subsequent figure(s) and/or the description thereof. For example, in one possible embodiment, the method 600 may be implemented in the context of the managed knowledge network platform 200 of FIG. 2. However, it is to be appreciated that the method 600 may be implemented in other suitable environments.

In operation 610, a new model 230 is added to the managed knowledge network platform 200. In operation 620, the recommendation engine 220 adds a row and a column to the model adjacency matrix $A(M_i,N_j)$ for the new model 230. In operation 630, the recommendation engine 220 computes a dissimilarity between the new model 230, $M_j$ and each existing model 230, $M_i$. In operation 640, the model adjacency matrix A is updated for each model pair. In one embodiment dissimilarity values are not computed between models 230 published by the same user 225 in the knowledge network platform 200.

In one embodiment, the dissimilarity value is computed as a Euclidean distance (e.g., square-root of a sum of squared products), where each squared product is a model attribute distance between values of a model attribute for the model pair $(M_i,M_j)$ scaled by a factor. Specifically, the model dissimilarity value for the model pair $(M_i,M_j)$ may be computed as the Euclidian Distance between models $M_i$ and $M_j$:

$$\text{Model dissimilarity}(M_i,M_j) = \sqrt{(w_1 d_1)^2 + (w_2 d_2)^2 + \ldots + (w_k d_k)^2}$$

where $d_1, d_2, \ldots, d_k$ are model attribute distances and $w_1, w_2, \ldots, w_k$ are weights for k model attributes of the model pair $(M_i,M_j)$.

In one embodiment, each model attribute distance between values of a model attribute is determined using a tree structure for the attribute and the model attribute distance is measured as the number of links between the attribute values through the hierarchy of the tree structure. For example, a tree structure for the algorithm model attribute may include nodes for "values" DNN, RNN, and CNN in a first portion of the tree structure, logistic regression and linear regression in a second portion of the tree structure, SVM, KNN, and Naïve Bayes in a third portion of the tree structure, and random forest and decision tree in a fourth portion of the tree structure. The number of links between similar attribute values is less than the number of links between less similar attribute values.

In another embodiment, the dissimilarity is computed as the reciprocal of the similarity value, i.e., 1/similarity value. The model similarity value for the model pair ($M_i, M_j$) is computed by taking the inverse of a cosine similarity between models $M_i$ and $M_j$:

$$\text{Model\_similarity}(Mi, Mj) = \cos(\theta) = \frac{\sum_{k=1}^{n} R_k T_k}{\sqrt{\sum_{k=1}^{n} R_k^2} \sqrt{\sum_{k=1}^{n} T_k^2}}$$

And the model dissimilarity value is the reciprocal of the model similarity value:

Model dissimilarity($M_i, M_j$)=1/Model_similarity($M_i, M_j$)

where $R_k$ and $T_k$ are model attribute values for k model attributes of model $M_i$ and model $M_j$, respectively.

The managed knowledge network platform 200 enables recommendation of one or more models 230 for a user 225 based on a combination of knowledge interaction between the users 225 and dissimilarity (or similarity) of the models 230. The managed knowledge network platform 200 enables the secure sharing of models 230 for machine learning model users, machine learning scientists, machine learning engineers, and verification testers. In one embodiment, the knowledge network platform 200 is a cloud managed knowledge network platform where one or more of the components of the storage and/or engine components of the managed knowledge network platform 200 are distributed between different storage and/or computing resources.

Figure 7:
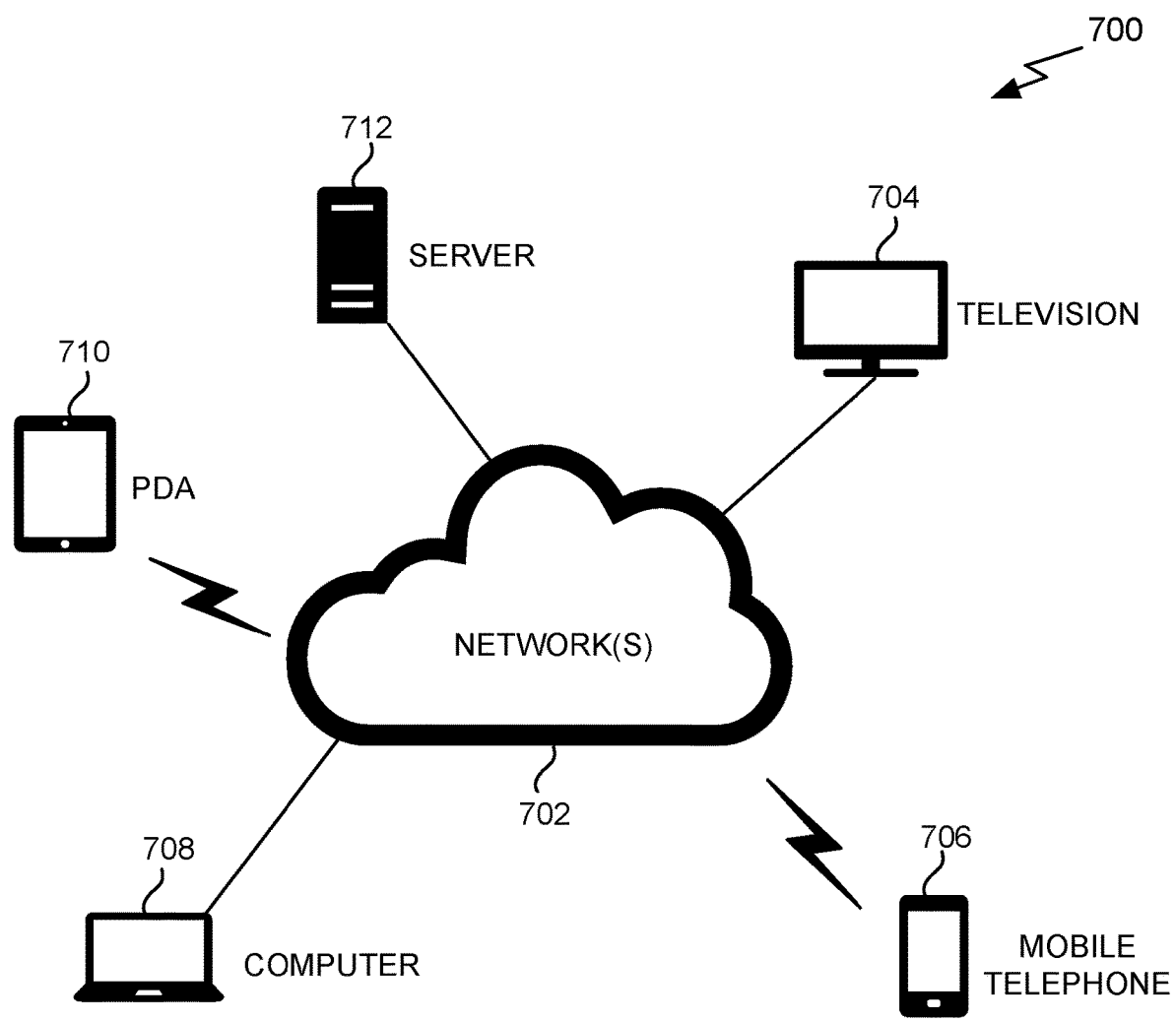
FIG. 7 illustrates a network architecture, in accordance with one embodiment.

FIG. 7 is a diagram of a network architecture 700, in accordance with an embodiment. As shown, at least one network 702 is provided. In various embodiments, any one or more components/features set forth during the description of any previous figure(s) may be implemented in connection with any one or more components 704-712 coupled to the at least one network 702. For example, in various embodiments, any of the components 704-712 may be equipped with one or more of components of the managed knowledge network platform 200 of FIG. 2, for managing knowledge and generating recommendations.

In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server 712 and a computer 708 may be coupled to the network 702 for communication purposes. Such computer 708 may include a desktop computer, laptop computer, and/or any other type of logic. Still yet, various other devices may be coupled to the network 702 including a personal digital assistant (PDA) device 710, a mobile phone device 706, a television 704, etc.

In one embodiment, the managed knowledge network platform 200 is implemented in a cloud environment and is managed in a cloud architecture that includes many different services. Related engines and business logic may be implemented in the cloud services to provide high-availability, high-reliability and low-latency. In one embodiment, a metadata service stores and manages all user data and platform management data and other metadata. In one embodiment, a distributed and scalable storage service is implemented for persisting models and related data.

Figure 8:
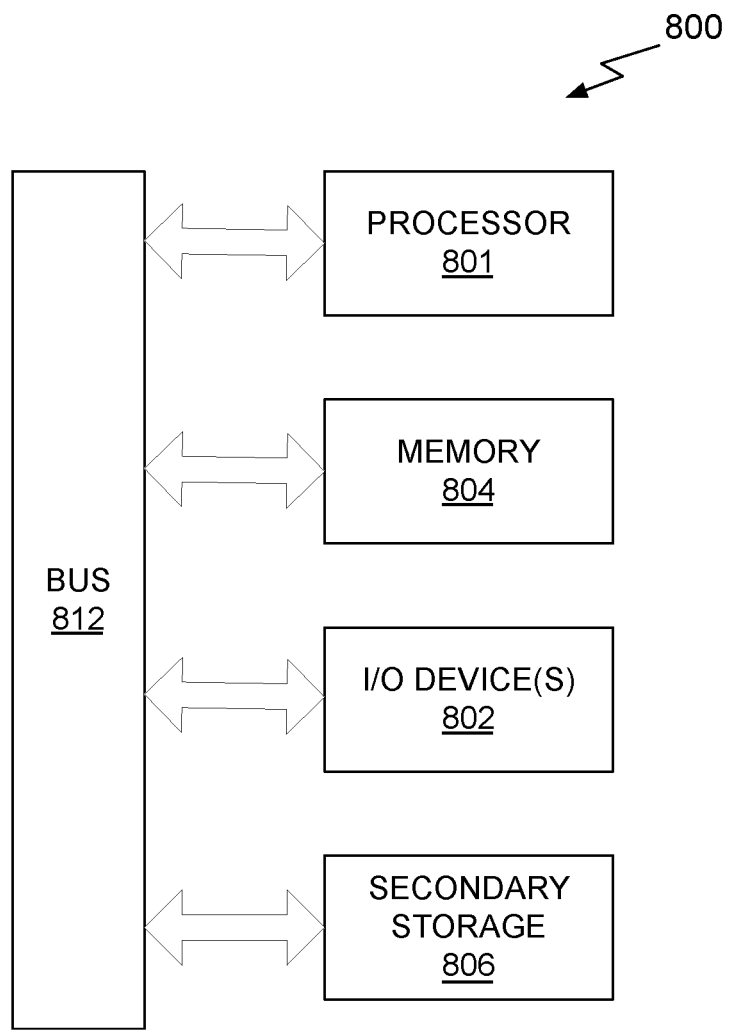
FIG. 8 illustrates an exemplary processing system, in accordance with one embodiment.

FIG. 8 illustrates an exemplary processing system 800, in accordance with one embodiment. As shown, a processing system 800 is provided including a plurality of devices that are connected to a communication bus 812. The devices include a processor 801, a memory 804, input/output (I/O) device(s) 802, and a secondary storage 806. The communication bus 812 may be implemented using any suitable protocol. One or more of the processor 801, memory 804, and a secondary storage 806 may be configured to implement the managed knowledge network platform 200.

The processing system 800 also includes the memory 804 (e.g. random access memory (RAM), etc.). The processing system 800 may also include the secondary storage 806. The secondary storage 806 includes, for example, a hard disk drive and/or a removable storage drive, a floppy disk drive, a magnetic tape drive, a compact disk drive, etc. The removable storage drive reads from and/or writes to a removable storage unit in a well-known manner. The processing system 800 may also include the I/O device(s) 802. Output devices may include a conventional CRT (cathode ray tube), LCD (liquid crystal display), LED (light emitting diode), plasma display or the like. User input may be received from the I/O device(s) 802, e.g., keyboard, mouse, touchpad, microphone, gaze tracking, and the like.

Computer programs, or computer control logic algorithms, may be stored in the memory 804, the secondary storage 806, and/or any other memory, for that matter. Such computer programs, when executed, enable the processing system 800 to perform various functions (as set forth above including, but not limited to those of a managed knowledge network platform 200, for example). Memory 804, secondary storage 806 and/or any other storage are possible examples of tangible computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), or the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, or electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; or the like.

Computer-readable non-transitory media includes all types of computer readable media, including magnetic storage media, optical storage media, and solid state storage media and specifically excludes signals. It should be understood that the software can be installed in and sold with the devices described herein. Alternatively the software can be obtained and loaded into the devices, including obtaining the software via a disc medium or from any manner of network or distribution system, including, for example, from a server owned by the software creator or from a server not owned but used by the software creator. The software can be stored on a server for distribution over the Internet, for example.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A processing device, comprising:
a non-transitory memory storing instructions; and
one or more processors in communication with the non-transitory memory, wherein the one or more processors execute the instructions to:
obtain model pair dissimilarity values for machine learning model pairs, each machine learning model pair including a first machine learning model of a plurality of machine learning models in a knowledge network platform and a different machine learning model of the plurality of machine learning models;
compute path lengths to a first user node of a plurality of user nodes representing users of the knowledge network platform, the path lengths computed to the first user node from a first machine learning model node of a plurality of machine learning model nodes in the knowledge network platform, and the path lengths computed to the first user node from other machine learning model nodes in the knowledge network platform, the first machine learning model node representing the first machine learning model and the other machine learning model nodes each representing a respective other machine learning model, the path lengths are based on weights of links between nodes established in response to user interaction with the knowledge network platform;

select at least one machine learning model of the plurality of machine learning models based on a combination of the model pair dissimilarity values and the path lengths; and generate, for a first user represented by the first user node, a recommendation that includes the selected at least one machine learning model.

2. The processing device of claim 1, wherein the one or more processors execute the instructions to publish the first machine learning model in response to input from the first user.

3. The processing device of claim 2, wherein the different machine learning models in the machine learning model pairs are not published by the first user.

4. The processing device of claim 2, wherein the one or more processors execute the instructions to provide a bidirectional link between the first user node and the first machine learning model node.

5. The processing device of claim 1, wherein the one or more processors execute the instructions to permit subscription to the first machine learning model by the first user.

6. The processing device of claim 1, wherein the one or more processors execute the instructions to:
permit subscription to the first machine learning model by a second user; and
provide a unidirectional link from the second user to the first user.

7. The processing device of claim 1, wherein the first user is a member of a first community and the one or more processors execute the instructions to provide a unidirectional link from the first user to a first community node representing the first community.

8. The processing device of claim 7, wherein the first community is hierarchical and includes a portion of a second community.

9. The processing device of claim 1, wherein the one or more processors execute the instructions to compute weight values for links between two or more of the user nodes and pairs of the user nodes and the machine learning model nodes.

10. The processing device of claim 9, wherein the one or more processors execute the instructions to reduce a weight for a link between the first user node and a second user node when a second user downloads the first machine learning model and the first machine learning model is published by the first user.

11. The processing device of claim 9, wherein the one or more processors execute the instructions to reduce a weight for a link between the first user node and a second user node when the first user answers a question asked by a second user.

12. The processing device of claim 9, wherein the one or more processors execute the instructions to compute weights for additional links between pairs of the user nodes and community nodes, and between pairs of the machine learning model nodes and the community nodes.

13. The processing device of claim 1, wherein the knowledge network platform is implemented in a cloud environment.

14. The processing device of claim 1, wherein the selecting comprises computing products for the first machine learning model node, wherein each product in the products is computed by multiplying the model dissimilarity value for each one of the machine learning model pairs and the path length for a shortest path between the first machine learning model node and one of the other machine learning model nodes that represents the different machine learning models.

15. The processing device of claim 14, wherein the at least one machine learning model included in the recommendation includes at least one machine learning model that is associated with a product of the products having a value less than a threshold value.

16. The processing device of claim 1, wherein the one or more processors execute the instructions to compute the model pair dissimilarity values based on machine learning model characteristics, and each model dissimilarity value in the model dissimilarity values corresponds to one of the different machine learning models as compared to the first machine learning model.

17. The processing device of claim 16, wherein the machine learning model characteristics include algorithm type, algorithm class, and a number of features.

18. A computer-implemented method comprising:
obtaining model pair dissimilarity values for machine learning model pairs, each machine learning model pair including a first machine learning model of a plurality of machine learning models in a knowledge network platform and a different machine learning model of the plurality of machine learning models;
computing path lengths to a first user node of a plurality of user nodes representing users of the knowledge network platform, the path lengths computed to the first user node from a first machine learning model node of a plurality of machine learning model nodes in the knowledge network platform, and the path lengths computed to the first user node from other machine learning model nodes in the knowledge network platform, the first machine learning model node representing the first machine learning model and the other machine learning model nodes each representing a respective other machine learning model, the path lengths are based on weights of links between nodes established in response to user interaction with the knowledge network platform;
selecting at least one machine learning model of the plurality of machine learning models based on a combination of the model pair dissimilarity values and the path lengths; and
generating, for a first user represented by the first user node, a recommendation that includes the selected at least one machine learning model.

19. The computer-implemented method of claim 18, further comprising computing weight values for links between two or more of the user nodes and pairs of the user nodes and the machine learning model nodes.

20. A non-transitory computer-readable media storing computer instructions, that when executed by one or more processors, cause the one or more processors to perform the steps of:
obtaining model pair dissimilarity values for machine learning model pairs, each machine learning model pair including a first machine learning model of a plurality of machine learning models in a knowledge network platform and a different machine learning model of the plurality of machine learning models;

computing path lengths to a first user node of a plurality of user nodes representing users of the knowledge network platform, the path lengths computed to the first user node from a first machine learning model node of a plurality of machine learning model nodes in the knowledge network platform, and the path lengths computed to the first user node from other machine learning model nodes in the knowledge network platform, the first machine learning model node representing the first machine learning model and the other machine learning model nodes each representing a respective other machine learning model, the path lengths are based on weights of links between nodes established in response to user interaction with the knowledge network platform;

selecting at least one machine learning model of the plurality of machine learning models based on a combination of the model pair dissimilarity values and the path lengths; and generating, for a first user represented by the first user node, a recommendation that includes the selected at least one machine learning model.

* * * * *